United States Patent [19]

Kosaka et al.

[11] Patent Number: 5,109,475
[45] Date of Patent: Apr. 28, 1992

[54] METHOD AND A SYSTEM FOR SELECTION OF TIME SERIES DATA

[75] Inventors: Michitaka Kosaka, Sagamihara; Hidenori Naoe, Kawasaki; Ikuo Matsuba, Zama; Shinichiro Miyaoka, Kawasaki; Motohisa Funabashi, Sagamihara; Toshiro Sasaki, Tokyo; Hirotaka Mizuno, Yokohama, all of Japan

[73] Assignee: Hitachi, Ltd., Tokyo, Japan

[21] Appl. No.: 393,396

[22] Filed: Aug. 14, 1989

[30] Foreign Application Priority Data

Sep. 19, 1988 [JP] Japan .................. 63-232360
Jun. 16, 1989 [JP] Japan .................. 1-152336

[51] Int. Cl.⁵ .......................... G06F 15/18
[52] U.S. Cl. ......................... 395/22; 395/11
[58] Field of Search ............ 364/513; 395/11, 22

[56] References Cited

PUBLICATIONS

J. J. Hopfield et al., "'Neural' Computation of Decisions in Optimization Problems", Biological Cybernetics, 52, 1985, pp. 141–152.

"Simulated Annealing (Chapter 2)" from Theory and Applications, published by D. Reidel Publishing Company, 1987, pp. 7–15.

Primary Examiner—Allen R. MacDonald
Attorney, Agent, or Firm—Fay, Sharpe, Beall, Fagan, Minnich & McKee

[57] ABSTRACT

Method and system of selecting desirable time series data pieces from many time series data pieces. Characteristics extracted from time series data pieces are applied to neurons and neuron state fluctuations are supervised and evaluated through execution of neurocomputing to select desirable time series data.

3 Claims, 14 Drawing Sheets

FIG. 11

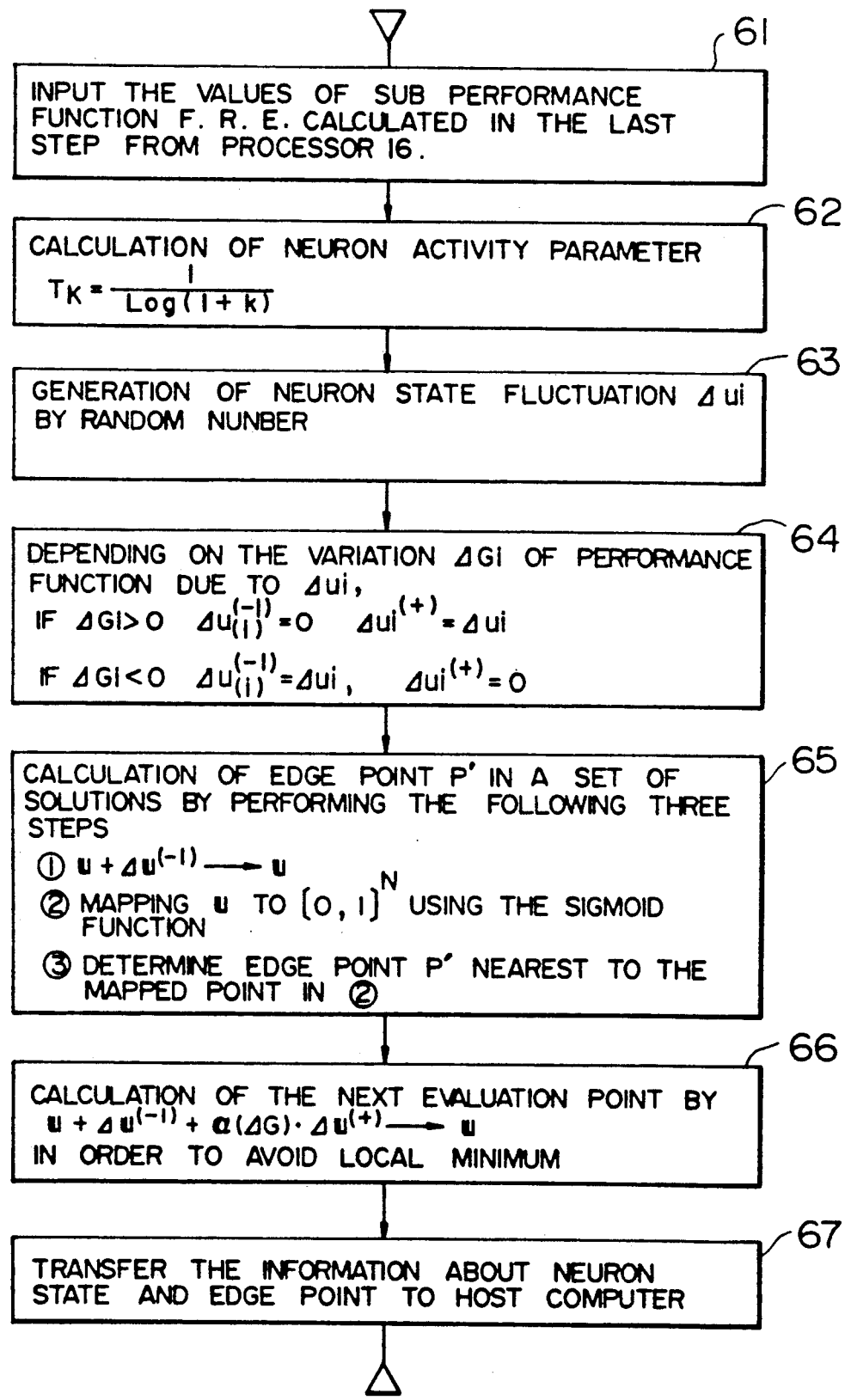

61 — INPUT THE VALUES OF SUB PERFORMANCE FUNCTION F. R. E. CALCULATED IN THE LAST STEP FROM PROCESSOR 16.

62 — CALCULATION OF NEURON ACTIVITY PARAMETER
$$T_K = \frac{1}{\log(1+k)}$$

63 — GENERATION OF NEURON STATE FLUCTUATION $\Delta u_i$ BY RANDOM NUMBER

64 — DEPENDING ON THE VARIATION $\Delta G_i$ OF PERFORMANCE FUNCTION DUE TO $\Delta u_i$,
IF $\Delta G_i > 0$  $\Delta u_{(i)}^{(-1)} = 0$  $\Delta u_i^{(+)} = \Delta u_i$
IF $\Delta G_i < 0$  $\Delta u_{(i)}^{(-1)} = \Delta u_i$,  $\Delta u_i^{(+)} = 0$ 65 — CALCULATION OF EDGE POINT $P'$ IN A SET OF SOLUTIONS BY PERFORMING THE FOLLOWING THREE STEPS
① $u + \Delta u^{(-1)} \longrightarrow u$
② MAPPING $u$ TO $[0, 1]^N$ USING THE SIGMOID FUNCTION
③ DETERMINE EDGE POINT $P'$ NEAREST TO THE MAPPED POINT IN ②

66 — CALCULATION OF THE NEXT EVALUATION POINT BY
$u + \Delta u^{(-1)} + \alpha(\Delta G) \cdot \Delta u^{(+)} \longrightarrow u$
IN ORDER TO AVOID LOCAL MINIMUM

67 — TRANSFER THE INFORMATION ABOUT NEURON STATE AND EDGE POINT TO HOST COMPUTER

FIG. 19

| A. B. C | S. A. | | DEVELOPED METHOD | |
|---|---|---|---|---|
| | RISK | RETURN | RISK | RETURN |
| 1.0 0.1 1.0 | 3.6 | 1.42 | 1.61 | 1.36 |
| 1.0 0.5 1.0 | 3.62 | 1.42 | 1.54 | 1.52 |
| 1.0 1.0 1.0 | 3.5 | 1.49 | 1.53 | 1.56 |
| 1.0 3.0 1.0 | 3.37 | 1.40 | 1.75 | 1.82 |
| 1.0 6.0 1.0 | 3.75 | 1.54 | 2.49 | 1.96 |

5,109,475

METHOD AND A SYSTEM FOR SELECTION OF TIME SERIES DATA

BACKGROUND OF THE INVENTION

This invention relates to method and system for extraction of some data pieces from many time series data pieces or extraction of a combination of data pieces. For example, method and system of the present invention make it possible to solve a problem such as a stock portfolio selection problem in which a small number of desirable issues having less risk and more return are to be selected from many issues.

Conventionally, a method of determining an optimum combination from many combinations is described in Biological Cybernetics 52, pp. 141-152, 1985 and Simulated Annealing. Theory and Applications, pp. 7-15, D. Reidel Publishing Company, 1987.

However, the above literatures do not discuss the specific manner of combining issues and selecting and preparing, from many combinations of issues, a small number of issues consisting of stocks having more returns and less risk, and a bond portfolio (a combination of stocks and bonds).

SUMMARY OF THE INVENTION

An object of this invention is to permit extraction (selection) of substantially optimum time series data pieces from a great number of time series data pieces or extraction of a combination of data pieces by applying neurocomputing and using parallel processing or high-speed processing of simple calculation, which extraction has hitherto been impossible.

Another object of this invention is to clarify tasks to be solved which are involved in combination optimization under constraints and in practical systems and to provide a method of solving the tasks.

Other objects of this invention will become apparent from the following description of the invention taken in conjunction with the accompanying drawings.

According to the invention, to accomplish the above objects, neurocomputing is applied to effect parallel operation and cooperative operation in respect of time series, and change each neuron state corresponding to the selectivity of each stock issue. Individual neuron states in neurocomputing are used as flags for deciding whether individual stocks are to be selected or not, and the neuron states are changed in such a manner that individual neurons act to minimize (or maximize) the performance function. Through the above operations, a desirable combination is determined.

The objects described previously are set up by the inventors of the present application who recognize tasks to be described below.

Conventionally, extraction of a small number of optimum time series data pieces from many time series data pieces has been difficult to achieve or impossible when the number of time series data pieces is extremely large.

As an example, the number of firms listed on the stock exchange is about 1000. In making an attempt to select from the listed issues about 20 issues having less risk and more return, a great number of combinations of about 20 issues are put up as candidates. Therefore, an optimum combination of issues can not be extracted within a short period of time. In addition, various problems encountered in applications to practical systems, including the problem of combination optimization under constraints often faced by the portfolio selection problem and the like as well as the manner of treating innumerable solutions stemming from neurocomputing, have not been clarified and solved yet.

BRIEF DESCRIPTION OF THE DRAWINGS

FIG. 11 is a flow chart of processings in the neuro-processor.

FIG. 19 is a table in which the performance of the invention is compared with that of the simulated annealing method to show the advantage of the former over the latter.

DESCRIPTION OF THE PREFERRED EMBODIMENTS

Figure 1:
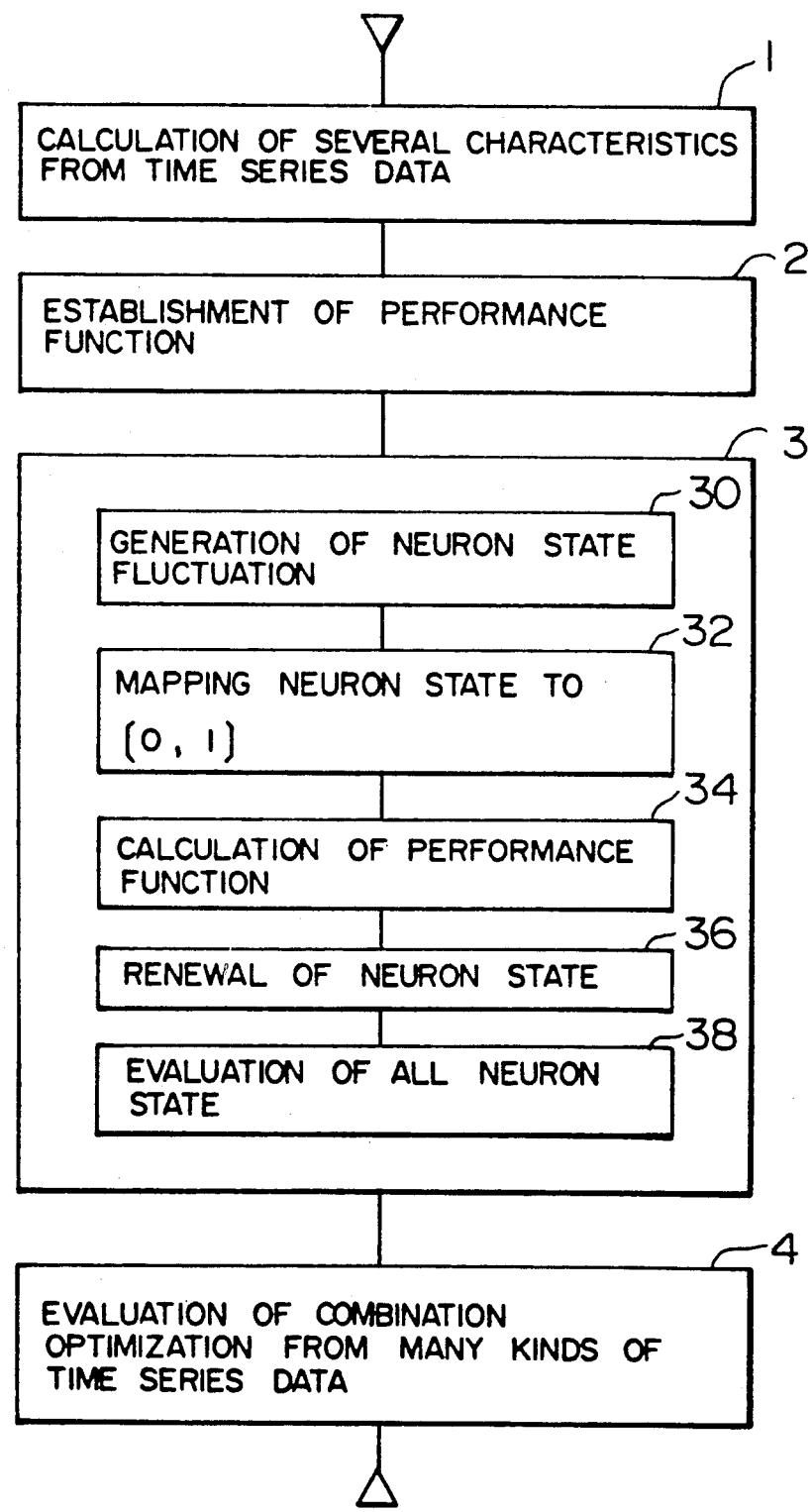
FIG. 1 shows fundamental processing steps in the present invention.

The outline of the present invention will first be described. One feature of the invention is directed to a time series data selection method having steps as shown in FIG. 1. Firstly, characteristics are calculated from time series data. A performance function is then established on the basis of the obtained characteristics. The performance function may be considered as a criterion for selecting desirable some time series data pieces from a plurality of time series data pieces. Nueron state fluctuations are generated as random numbers through neurocomputing and neuron states are mapped to a space [0, 1] representative of values between 0 (zero) to 1 (one). The performance function is calculated and neuron states are renewed so that the performance function can be minimized (or maximized). The renewal of neuron states is effected through procedure of evaluating the performance function by using states of all neurons. A combination of time series data pieces in which neuron states approximate 1 (one) is evaluated from many time series data pieces. Fundamentally, the present invention is designed to include the above four steps.

The fundamental principle of the combination optimization will now be described.

Generally, a problem of undertaking selection of M objects out of N objects and minimizing a performance function F obtained from selected M objects can be formulated by the following equations (1) and (2):

$$F(x_1, x_2, \ldots, x_N) \to \min \qquad (1)$$

$$x_i (0 \text{ or } 1) \qquad (2)$$

where $$\sum_{i=1}^{N} x_i = M$$

Figure 2:
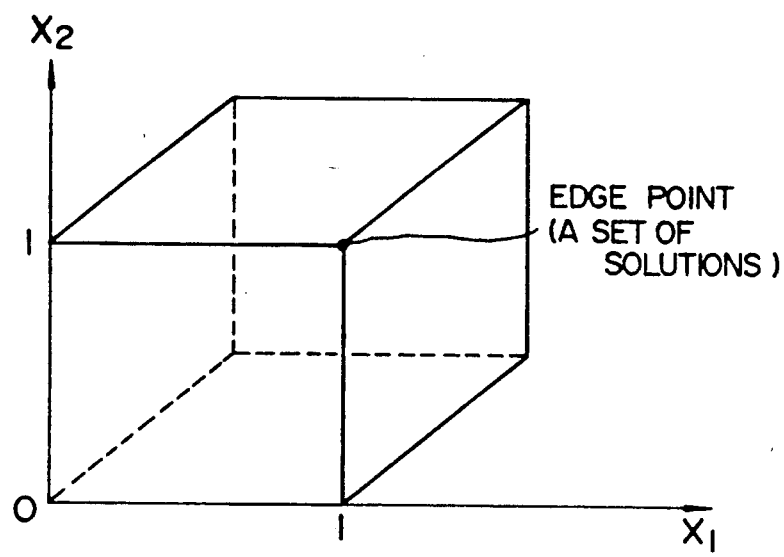
FIG. 2 is a diagram showing the concept of a set of solutions represented by edge points of a $2^N$ cube.

In equation (2), $x_i = 0$ signifies that an i-th object is not selected and $x_i = 1$ signifies that the i-th object is selected. Solutions to this problem of combination optimization lie on edge points of a space $[0, 1]^N$, i.e., an N-dimensional space defining elements of values ranging from 0 to 1, in which $$\sum_{i=1}^{N} x_i = M$$

is valid. An example of a three-dimensional space is illustrated in FIG. 2. The performance function F is assumed to be continuous and differentiable in the interior of the space $[0, 1]^N$. Since the aforementioned problem is that of minimizing equation (1) under constraints of equation (2), a new performance function G is introduced reading:

$$G(x_1, x_2, \ldots, x_N) = F(x_1, \ldots, x_N) + C \left( \sum_{i=1}^{N} x_i - M \right)^2 \qquad (3)$$

The problem of minimizing equation (1) under constaints of equation (2) is reduced to a problem of minimizing equation (3). In equation (3), C is a weight coefficient indicating how much the constraints of $$\sum_{i=1}^{N} x_i - M = 0$$

are taken into consideration. In order to transform the minimization problem in the space $[0, 1]^N$ into a minimization problem in a space $[-\infty, \infty]^N$, the following function f is introduced:

$$x = f(u).$$

Elements $u \in [-\infty, \infty]$ are mapped to $x \in [0, 1]$ through the function f. Since solutions $x_i$ for the combination optimization take 0 or 1, the function f may be defined by the following equation (4) which is continuous and differentiable and by which most of values of variable u are transformed into 0 or 1:

$$f(u) = \frac{1}{2} \left( 1 + \tanh \left( \frac{u}{u_0} \right) \right). \qquad (4)$$

Figure 3:
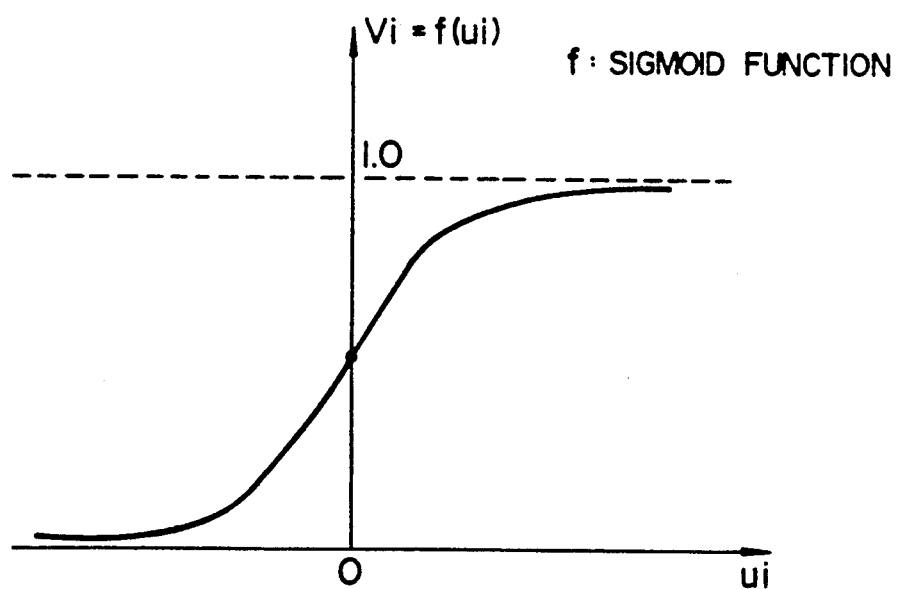
FIG. 3 is a graphic representation useful to explain a mapping function.

The function f defined by equation (4) is illustrated in FIG. 3 wherein an element $u_i$ of u is represented on abscissa and $v_i = f(u_i)$ is represented on ordinate. Thus, equation (3) can be transformed into a function G' $(u_1, u_2, \ldots, u_N)$, continuous and differentiable in respect of u, which reads:

$$G'(u_1, u_2, \ldots, u_N) = G(f(u_1), f(u_2), \ldots, f(u_N)). \qquad (5)$$

The function G' is a continuous function in the N-dimensional space and therefore, as in the case of the ordinary optimization, the differential coefficient of G' in respect of $u_i$ may be used in order that the performance function is minimized by changing the state of $u_i$ by $\Delta u_i$ such that $$\frac{\partial G'}{\partial u_i} \Delta u_i$$

becomes negative. A specific method for calculation of a fluctuation of $\Delta u_i$ will be detailed later.

A method of the present invention as applied when many combinations satisfying the condition of combination optimization exist will be described below. When solutions to a combination optimization problem such as a portfolio selection problem are sought for by applying the concept of neurocomputing many combinations of similar characteristics such as similar risk or similar return are involved. In that case, it is necessary that individual neuron states be supervised and one or several combinations be selected on the basis of results of supervision. Therefore, the preference for selection is programmed and prepared in advance. By preparing in this manner a processor adapted to select preferable combinations independently of the processor adapted to process neuron state fluctuations, combinations meeting purposes can be selected from many combinations of characteristics of the same degree.

Functions of individual steps in the fundamental flow chart shown in FIG. 1 will be explained below.

In step 1, time series data is brought into a framework of combination optimization.

In step 2, performance of the combination optimization is defined as a performance function.

In step 3, the neurocomputing processing for minimizing the performance function is carried out by sequentially changing neuron states.

In step 4, the selection of time series data pieces is carried out in terms of neuron states.

The fundamental principle and operation of the invention will now be paraphrased by referring to a specific example.

As an embodiment of the invention, an example will be described which is applied to a problem of selecting a portfolio of stocks in the field of finance and security.

There are a variety of approaches to the stock portfolio selection problem. As an approach, a method is conceived herein by which a stock meeting a preference, of an investor, to risk and return is selected on the basis of the preference of the investor and time series data representative of the price of the stock which has moved in the past. The above selection method is meritorious in that a stock can be selected on the basis of information about time series data in the past and may be carried out in a manner described below. An average $\mu_i$ of return ratios of different stocks and covariance $\sigma_{ij}$ between different stocks are calculated from time series data in the past. A return $\mu$ and a risk $\sigma^2$ in a portfolio of selected stocks are indicated by equations (6) and (7), respectively:

$$\mu = \sum_i \mu_i x_i \quad (6)$$

$$\sigma^2 = \sum_i \sum_j \sigma_{ij} x_i x_j \quad (7)$$

And a set of stocks $\{x_i\}$ are selected which maximize the return $\mu$ and minimize the risk $\sigma^2$.

Teachings of the invention may be applied to this problem as follows. Firstly, in respect of individual neuron states $u_i$ subject to neurocomputing, a function $V(x)$ is defined which can continuously map $u_i$ to, preferably, 0 and 1. Selection is so ruled that when the value of $V(u_i)$ determined depending on neuron states is 1, a stock i is selected and when the value of $V(u_i)$ is 0, the stock i is not selected. Under this condition, a multi-objective problem of undertaking selection of M stocks out of N stocks, maximizing the return $\mu$ in equation (6) and minimizing the risk $\sigma^2$ in equation (7) can be formulated by a single performance function if the degrees of preference for individual objects are given as parameters. Thus, the problem of selecting a stock portfolio through neurocomputing is nothing but giving a performance function G $$G = \frac{A}{2} \sum_{i=1}^{N} \sum_{j=1}^{N} \sigma_{ij} V(u_i) V(u_j) - B \sum_{i=1}^{N} \mu_i V(u_i) + \frac{C}{2} (M - E)^2 \quad (8)$$

and shifting neuron states $u_i (i=1, \ldots, N)$ such that the function G can be minimized. In equation (8), E is the total number of selected stocks which is indicated by $$E = \sum_{i=1}^{N} V(u_i). \quad (9)$$

A is a weight parameter concerning the risk, B is a weight parameter concerning the return, and C is a weight parameter concerning the difference between the number M of stocks subjected to selection and the total number E of selected stocks. Any of these values, representing the preference of the investor, can be inputted interactively.

One subject of the present invention is to provide a method of realizing minimization of the performance function G in equation (8) through parallel processing of neurocomputing.

The method according to the invention will be outlined with reference to FIG. 1.

In step 1, characteristics are calculated from time series data. In applying the invention to the problem of selecting a stock portfolio, return $\mu$ and risk $\sigma^2$ are taken as characteristics and calculation is carried out in accordance with equations (6) and (7).

In step 2, a performance function, particularly defined by equation (8), is established. The parameters A, B, C and M in equation (8) are inputted interactively.

In step 3, the performance function is minimized through neurocomputing. In this procedure, neuron states are changed sequentially. This step 3 is divided into five steps 30, 32, 34, 36 and 38 as shown in FIG. 1. Firstly, neuron states are generated (step 30) and mapped to [0, 1] (step 32). In step 32, in respect of the states $u_i$, $V(u_i)$ in equation (9) is calculated specifically. In step 34, the performance function G is calculated in accordance with equation (8). Thereafter, the neuron states $u_i$ are changed in directions in which the performance function G is decreased (step 36).

The above steps 30, 32, 34 and 36 are executed for each neuron. Subsequently, all of the neuron states and supervised to check whether minimization of the performance function is achieved (step 38). Unless reached, the procedure returns to step 32 and the steps 32, 34, 36 and 38 are repeated.

If minimization of the performance function is reached, combination optimization of the time series data is evaluated by adopting "1" states and disregarding "0" states.

CONSTRUCTION 1 OF SYSTEM

Figure 4:
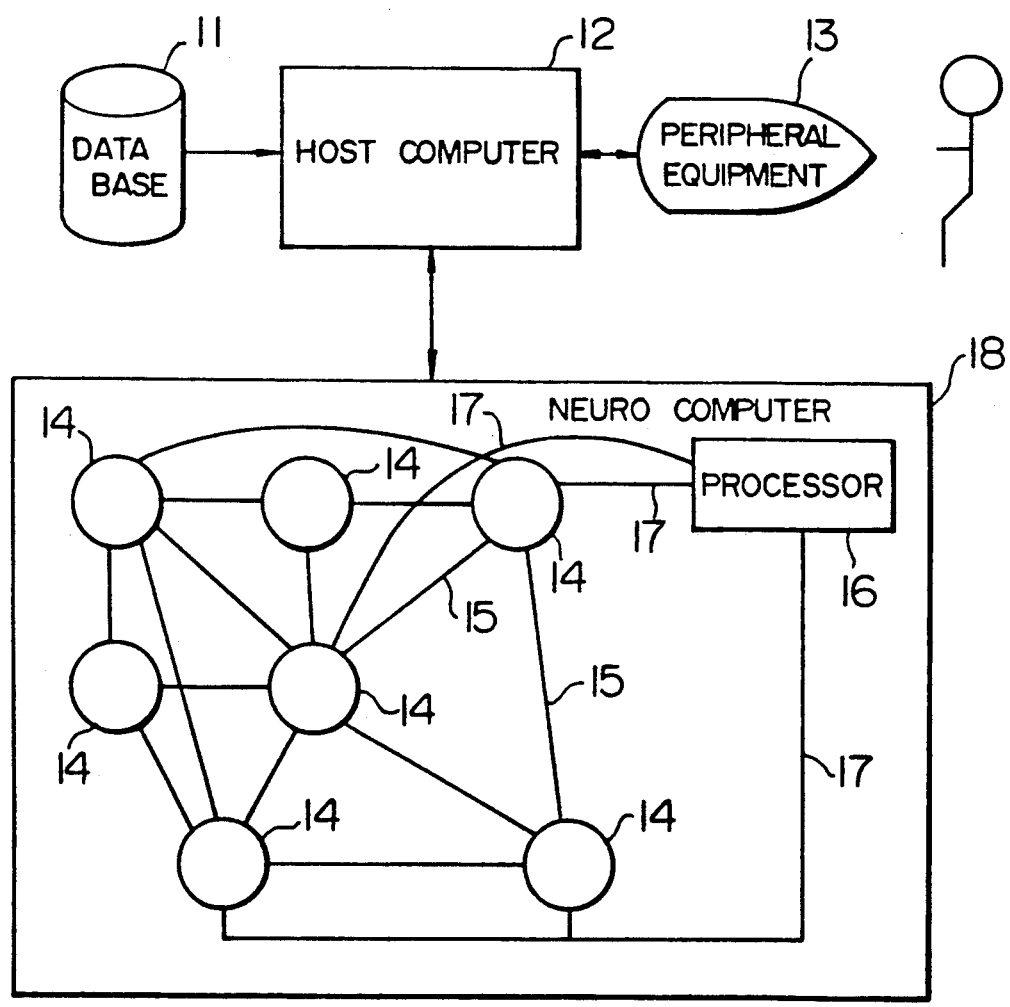
FIG. 4 is a schematic diagram illustrating a system arrangement using a neurocomputer.

An embodiment of a system according to the invention is constructed as shown in FIG. 4. This system comprises a data base (memory) 11, a host computer 12, a peripheral equipment 13 for man-machine interface, and a neurocomputer 18 for neurocomputing. The neurocomputer 18 includes a processor 16 for calculating individual neuron states 14 (simply referred to as neurons hereinafter) and supervising states of all of the neurons, meshes 15 for interconnecting individual neurons and meshes 17 for interconnecting the neurons 14 and the supervising processor 16.

OVERALL PROCESSING FLOW

Figure 5:
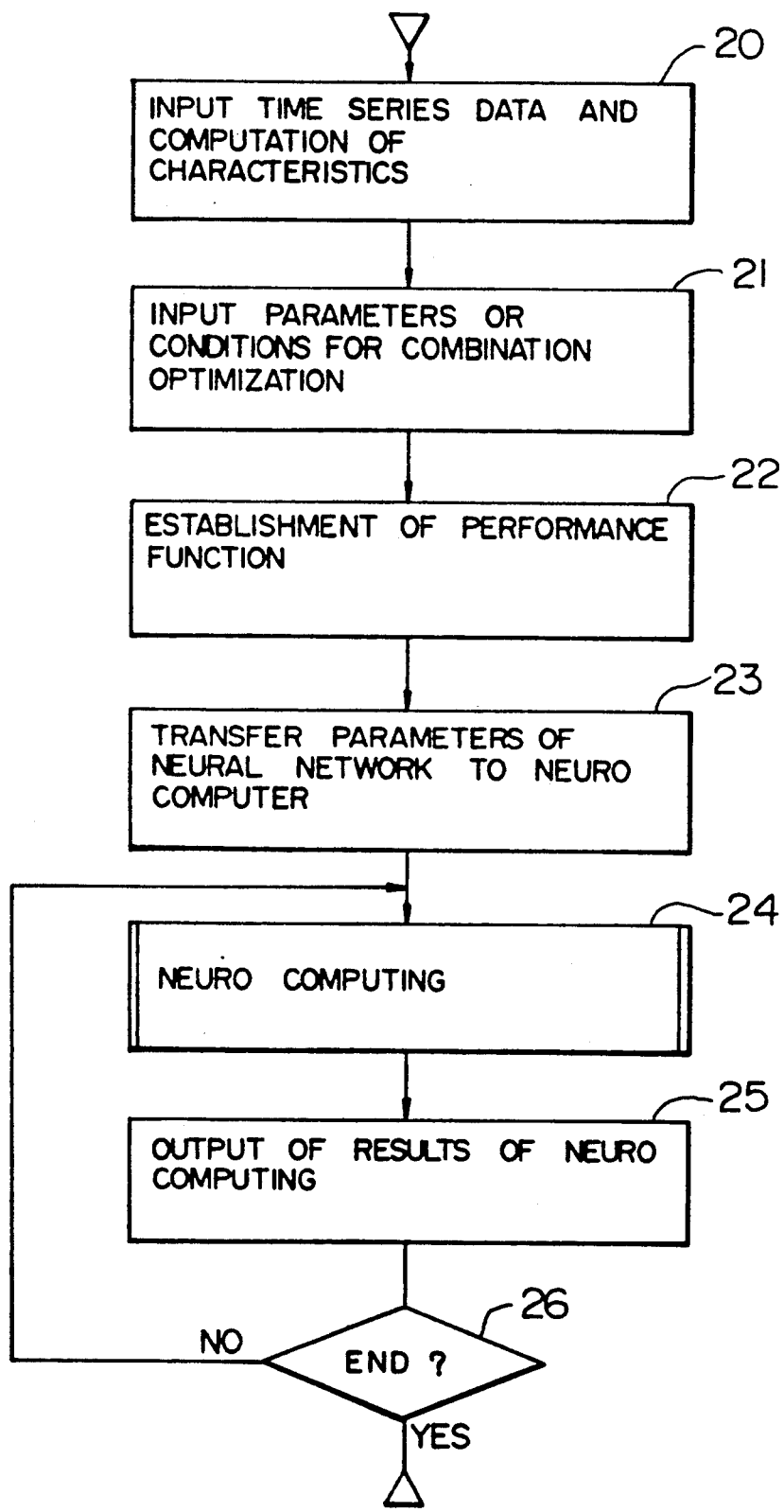
FIG. 5 is a flow chart showing processings in the system arrangement of FIG. 2.

When the system constructed as shown in FIG. 4 is applied to the problem of stock portfolio selection, the host computer 12 operates in accordance with a processing flow as shown in FIG. 5.

Firstly, time series data representative of stock prices $P_t^i$ of stocks i over K days is read out of the time series data base 11. Then, return ratio $\gamma_t^i$ of each stock i is calculated pursuant to $$\gamma_t^i = \frac{P_{t+1}^i - P_t^i}{P_t^i}. \quad (10)$$

Based on the return ratio $\gamma_t^i (i=1, \ldots, K-1)$, averaged $\mu_i$ among individual stocks i and covariance $\sigma_{ij}$ between stocks are calculated pursuant to, $$\mu_i = \sum_{i=1}^{k-1} \gamma_t^i / (k-1) \quad (11)$$

$$\sigma_{ij} = \sqrt{\sum_{i=1}^{k-1} (\gamma_t^i - \mu_i)(\gamma_t^j - \mu_j)/(k-1)} \quad (12)$$

(Step 20).

Subsequently, parameters A, B and C which are representative of a preference of the investor to the portfolio and parameter M (see equation (8)) as well as the portfolio selecting criterion condition is inputted to the host computer 12 through the peripheral equipment 13 (step 21).

In step 22, equation (8) descriptive of the performance function G to be minimized by individual neurous is established using $\mu_i$ and $\sigma_{ij}$.

Figure 6:
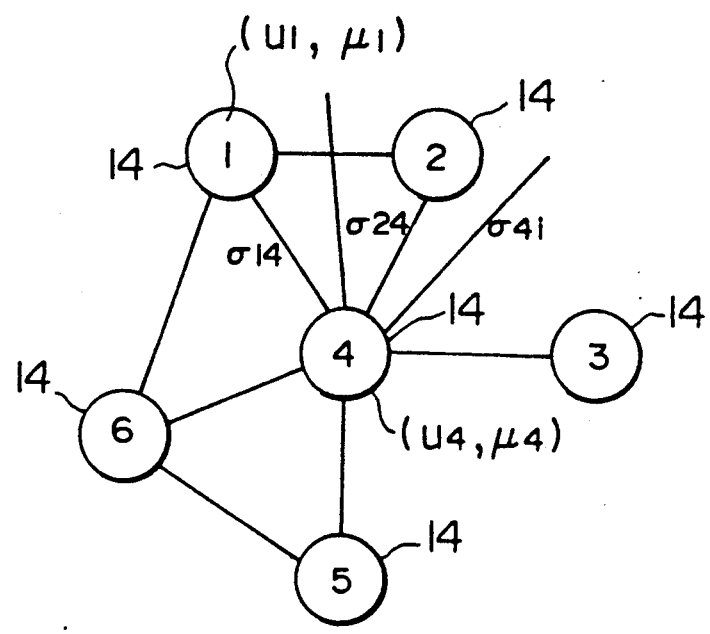
FIG. 6 is a diagram illustrating interconnection among neurons.
Figure 7:
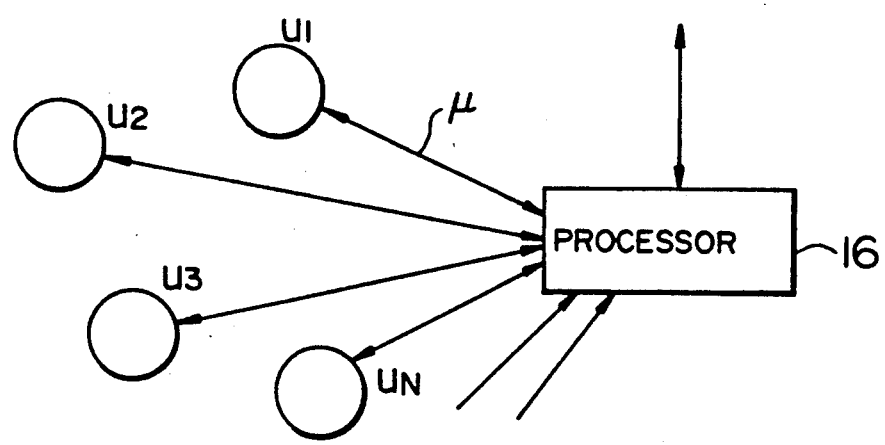
FIG. 7 is a diagram illustrating connection of a processor, serving as supervisor, to neurons.

In step 23, data necessary for portfolio selection is transferred to the neurocomputer 18. Individual neurons 14 of the neurocomputer 18 are interconnected with each other as illustrated in FIG. 6. Each neuron 14 is connected with all of the remaining neurons 14 (In the drawings, some of interconnections among neurons 14 are omitted for simplicity of illustration). Covariance $\sigma_{ij}$ between stocks i and j is allotted to a mesh which connects neurons i and j, where i and j represent numerals described in circles in FIG. 6. State $u_i$ and averaged return ratio $\mu_i$ of stocks, representative of activity of each neuron, and allotted to each neuron 14. The processor 16 is connected to the neurons 14 as shown in FIG. 7 in order to supervise states. Transferred to the processor 16 for supervision of states of all neurons are (a) performance parameters A, B and C and parameter M, (b) the total number of neurons corresponding to the total number of stocks, (c) averaged return ratio $\mu_i$ of stocks and covariance $\sigma_{ij}$ (i = 1, ..., N) between stocks and (d) the portfolio selecting criterion condition inputted in step 21. Values of the parameters necessary for neurocomputing are transferred from the host computer 12 to neurocomputer 18.

In step 24, minimization of the performance function G is carried out by means of the neurocomputer. Neurocomputing executed by the neurocomputer will be detailed later. In step 25, a stock, along with risk and return, selected on the basis of neuron states detected by the processor 16 and meeting the portfolio selecting criterion condition is outputted. The output signal from the neurocomputer 18 is transmitted through the host computer 12 to the peripheral equipment 13 so as to be displayed on the screen thereof. If the results are satisfactory to the investor (user), the procedure ends in step 26 but if unsatisfactory, the procedure keeps running.

NEUROCOMPUTING

The neurocomputing in the step 24 of the flow chart shown in FIG. 5 will now be described in greater detail. Individual neurons subjected to neurocomputing are interconnected as has been described with reference to FIGS. 6 and 7. The neurocomputer 18 shown in FIG. 4 executes the neurocomputing.

Firstly, a method of shifting neuron states will be described. Neurons act independently. When a neuron changes its state, this neuron consults all neuron states to check whether the performance function can be minimized. Generally, each neuron acts to keep changing its state by repeating the above action to approach, from a global viewpoint, minimization of the performance function. Available as methods of calculating neuron state shift are a simulated annealing method and a Hopfield method. However, a method to be described below may be applied efficiently to the portfolio selection problem wherein the performance function G can be described explicitly by using a combination of many time series data pieces and can be differentiated by variables $u_i$ representative of neuron states. As regards the direction and magnitude of neuron state fluctuation $du_i$, the direction of $du_i$ is so defined as to make $$\frac{\partial G}{\partial u_i}.$$

$du_i$ negative as in the case of the ordinary hill-climbing method.

Therefore, the direction of $du_i$ depends on the differential coefficient $$\frac{\partial G}{\partial u_i}.$$

However, the magnitude of the fluctuation $du_i$ can not be calculated easily from $G'(u_1, \ldots, u_N)$ because there exist many points which make $$\frac{df}{du} = 0$$

valid (see equations (4) and (5)).

Figure 8:
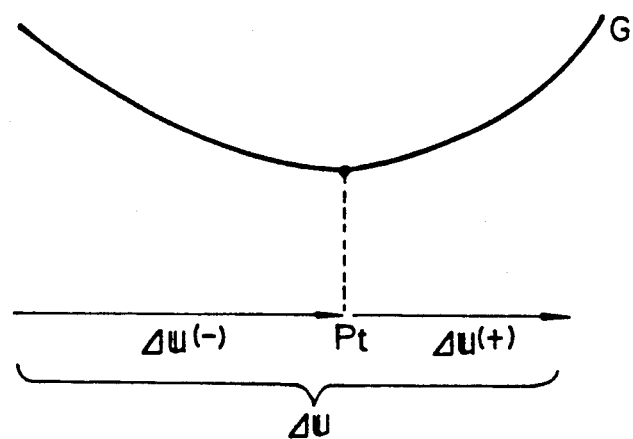
FIG. 8 is a graphic representation useful to explain the division of a fluctuation $\Delta u$ into $\Delta u^{(-)}$ and $\Delta u^{(-)}$ in the hill-climbing method.

Then, based on the analogy to the simulated annealing method, the magnitude of the fluctuation $du_i$ is determined using random numbers having a variance $T_k$ which decreases with time. When the amount of the fluctuation $du_i$ is determined in this manner, $u_i + du_i$ makes a fluctuation of performance function $\Delta G'$ positive or negative, respectively. A fluctuation du ($du_i$, ..., $du_N$) of a state u ($u_i$, ..., $u_N$) is determined in this manner and the performance function is minimized at a point P within the fluctuation du (see FIG. 8).
Where $$du = du^{(-)} + du^{(+)} \tag{13},$$

the point P can be obtained by mapping $u + du^{(-)}$ to the space [0, 1]. In equation (13), $du^{(-)}$ is a part of the du which is obtained by making zero the fluctuation $du_i$ that prescribes $\Delta G' > 0$ and $du^{(+)}$ is a part of the du which is obtained by making zero the fluctuation $du_i$ that prescribes $\Delta G' < 0$.

Figure 9:
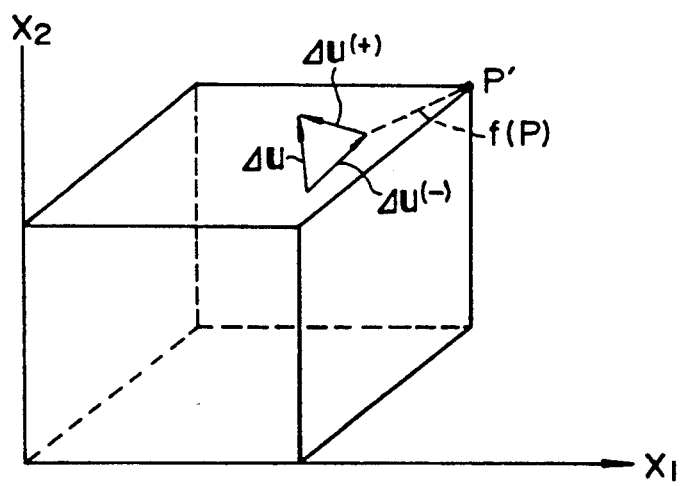
FIG. 9 is a conceptional diagram showing the behaviour of hill-climbing in the interior of a space $[0, 1]^N$.

Through $x = f(u)$, the point P is mapped to a point in the interior of the space $[0, 1]^N$ but is not mapped to one of edge points of a $2^N$ cube which include a set of solutions. Therefore, an edge point P', closest to a mapped point of the point P to $[0, 1]^N$, of the $2^N$ cube is calculated. Calculation of P' is done by converting a mapped value of each state $f(u_i)$ to the space $[0, 1]^N$, representative of the point P, into 0 or 1 through rounding. The behavior of this calculation is illustrated in FIG. 9. The point P' is represented by an N-dimensional vector having elements 0 or 1. When the sum of the elements of P' is M, the point P' is involved in a candidate set of solutions. Among the thus obtained candidate set of solutions, a solution capable of minimizing the performance function G is determined as optimum combination.

In order to avoid danger of occurrence of a local optimum solution, the relation between $u^{(k)}$ calculated by k-th calculation operation and $u^{(k+1)}$ calculated by (k+1)-th calculation operation is determined as follows.

Figure 10:
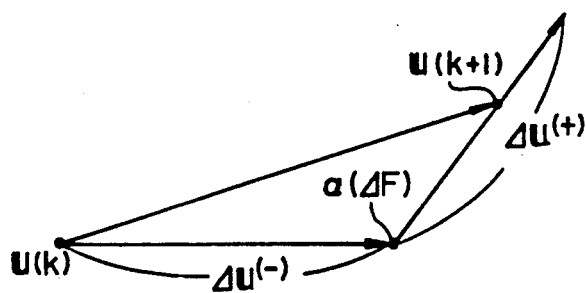
FIG. 10 is a diagram for explaining the manner of changing states u in order to avoid local minima.

More particularly, even for an element included in $du^{(+)}$, a coefficient $\alpha(\Delta G(i))$, $0 \leq \alpha \leq 1$ is selected which depends on the value of a change $\Delta G(i)$ of the performance function in respect of $du_i$ and $$u^{(k+1)} = u^{(k)} + du^{(-)} + \alpha(\Delta G) \cdot du^{(+)} \tag{14}$$

is calculated (FIG. 10), where $\alpha(\Delta G)$ takes $\alpha(\Delta G(i))$ for elements of $du^{(+)}$ not being 0 (zero) but takes 0 (zero) in the other case. Through the above procedure, an optimum combination capable of minimizing the performance function G can be obtained.

To realize the above procedure, each neuron repeats one cycle of processing flow as shown in FIG. 11. Firstly, in step 61, the processor 16 for supervising the neurocomputer calculates values of the performance function, risk and return under neuron states in the previous step. Thus, the risk E, the return R and the number F of selected objects are calculated pursuant to the following equations:

$$E = \sum_{i=1}^{N} V(u_i) \tag{15}$$

$$R = \sum_{i=1}^{N} \mu_i V(u_i) \tag{16}$$

$$F = \sum_{i=1}^{N} \sum_{j=1}^{N} \sigma_{ij} V(u_i) V(u_j) \tag{17}$$

where $u_i$ represents the active state of neuron and V represents a function for mapping $U_i$ continuously to [0, 1]. The V(x) used in the present invention is defined by $$V(x) = \frac{1}{2}(1 + \tan h(x/u_0)) \tag{18}$$

, where $u_0$ is constant, and plotted in FIG. 3 but any functions may be used which can map neuron states to [0, 1] continuously and as accurately as possible.

In step 62, a parameter $T_k$ representative of the activity of neuron at present is calculated. The neuron activity is so designed as to be active initially but highly changeable such that the activity decreases with time. In the present invention, the neuron activity parameter is defined by $$T_k = \frac{T_0}{\log(1 + K)} \tag{19}$$

indicating that the neuron state is changed in accordance with a Gaussian noise having an average of 0 (zero) and a variance of $T_k$. In step 63, the fluctuation $du_i$ of each neuron is calculated by supposing a value of $u_i$ and the differential coefficient $$\frac{\partial G}{\partial x_i}$$

of performance function G ($x_i, \ldots, x_j$) is calculated by supposing a value of $x_i$ ($i = 1, \ldots, N$) at present. Thereafter, the fluctuation $du_i$ is calculated using random numbers having a variance, the magnitude of which decreases with time, and the direction of the fluctuation $du_i$ is determined in compliance with the sign of $$\frac{\partial G}{\partial x_i}.$$

The above procedure is executed for $i = 1, \ldots, N$.

$$\text{If } \frac{\partial G}{\partial x_i} < 0 \text{ or } \frac{\partial G}{\partial x_i} > 0, \text{ there results} \tag{20}$$

$du_i > 0$ or $du_i < 0$, respectively where $x_i = V(u_i)$.

In step 64, the variation $\Delta G_i$ of performance function due to $du_i$ is calculated.

If $\Delta G_i > 0$ then $du^{(-1)}(i) = 0$, $du^{(+)}(i) = du_i$ and if $\Delta G_i < 0$ then $du^{(-1)}(i) = du_i$, $du^{(+)}(i) = 0$.

The above procedure is executed for $i = 1, \ldots, N$. For calculation of $\Delta G_i$, changes E', R' and F' in values of the E, R and F concomitant with the change of $u_i$ to $u_i + du_i$ are used which are indicated by equations (21), (22) and (23), respectively:

$$E' = E - V(u_i) + V(u_i + du_i) \tag{21}$$

$$R' = \{R + (-\mu_i V(u_i) + \mu_i V(u_i + du_i))\} \tag{22}$$

$$F' = \left(F + \sum_{j=1}^{N} \{\sigma_{ij} V(u_j) \cdot (V(u_i + du_i) - V(u_j)) + \sigma_{ij}(V(u_i + du_i) - V(u_i))^2\}\right). \tag{23}$$

At that time, a performance function G' generated by a new neuron state can be calculated pursuant to $$G' = \frac{A}{2} * F' - B * R' + \frac{C}{2} * (M - E')^2 \tag{24}$$

where * represents multiplication. Thus, the performance function G is valid when no neuron state change occurs and the performance function G' is valid when the state of an i-th neuron changes. Then the difference $\Delta G_i$ is calculated pursuant to $$\Delta G_i = G' - G \tag{25}$$

In step 65, the point P, at which the performance function G is minimized, is determined by changing the state in accordance with $u + du^{(-1)}$, elements of the P are mapped to [0, 1] through $$X = f(u) = \frac{1}{2}\left(1 + \tan h\left(\frac{u}{u_0}\right)\right).$$

and an edge point P', nearest to a mapped point, of a $2^N$ cube is determined. In step 66, $\alpha_i(\Delta G)$ is applied to $du^{(+)}$ and $$u + du^{(-)} + \alpha(\Delta G) \cdot du^{(+)} \tag{26}$$

is calculated. The application of $\alpha_i(\Delta G)$ is necessary to avoid the occurrence of a local optimum solution. In this embodiment, $\alpha_i$ is generated as random numbers which distribution function is defined as $\alpha_i = \exp(-\Delta G_i/T_k)$ by using $\Delta G_i$ and $T_k$. In step 67, the neuron of interest transmits elements of the edge point P' and its state determined in step 66 to the processor 16 and different neurons, thus completing one cycle of processing.

Through the above procedure, individual neuron states can be renewed. It will be appreciated that renewals of individual neuron states $u_i$ are independent of each other.

Each neuron calculates the performance function independently to renew its state but the value of the performance function does not always decrease monotonously. Therefore, the provision of the processor 16, operable to supervise all neuron states and select a neuron state complying with the portfolio selection condition, is needed. Processings in the processor 16 are shown in a flow chart of FIG. 12. In step 81, individual neuron states $u_i$ are fetched. In step 82, risk F and return R, representative of sub-performance function, and the number E of selected objects are calculated using equations (15), (16) and (17). In step 83, a performance function is calculated using equation (8). Based on the performance function, the inputted portfolio selection condition and preference condition (for example, $F > F_0$, $G > G_0$, $R > R_0$) are checked in step 84. All of neuron states satisfying the selection condition and preference condition are transferred to the host computer 12 in step 85. Through the above procedure, a stock portfolio meeting the selection condition affected by the change of neuron states can be detected. Eventually, the selected portfolio information (selected stock and values of risk and return concomitant therewith) is delivered to the peripheral equipment, thereby leaving the investor to select a portfolio which is the most preferable to him.

Further, in case where it is expected that many combinations exist which meet the portfolio selection condition, the following procedure is taken. Priority is ruled in connection with the preference to the portfolio selection and set in the processor 16. Comparison is effected between the portfolio at present and that already selected to check whether the priority of the preference of the present portfolio is higher or lower. In this manner, the number of portfolios to be selected can be reduced. As will be seen from the above, while the neuroprocessor executes as a whole parallel processings in accordance with a predetermined criterion to find any solutions from a global viewpoint, the processor 16 operates to perform logical decision processings on the basis of neuron states.

Figure 13:
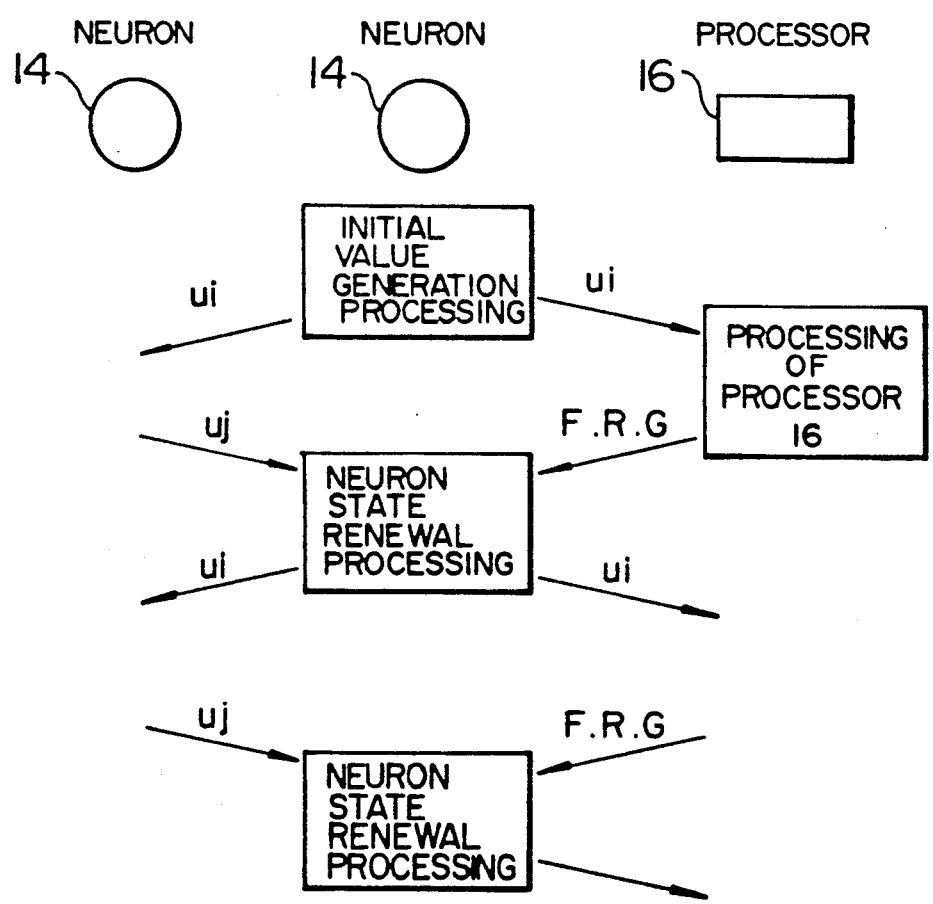
FIG. 13 is a diagrammatic representation showing data flows and process timings.

Parallel operation and data exchange between individual neurons 14 and the processor 16 are carried out in accordance with a flow diagram of FIG. 13. Firstly, a neuron generates an initial value. In consideration of convergence to be described later, the initial value is preset such that $V(u_i)$ takes a value near 0.5, by applying normally distributed random numbers near $u_i = 0$. State $u_i$ from a neuron of interest and the risk F and return R and the number E are transferred to a different neuron.

Figure 12:
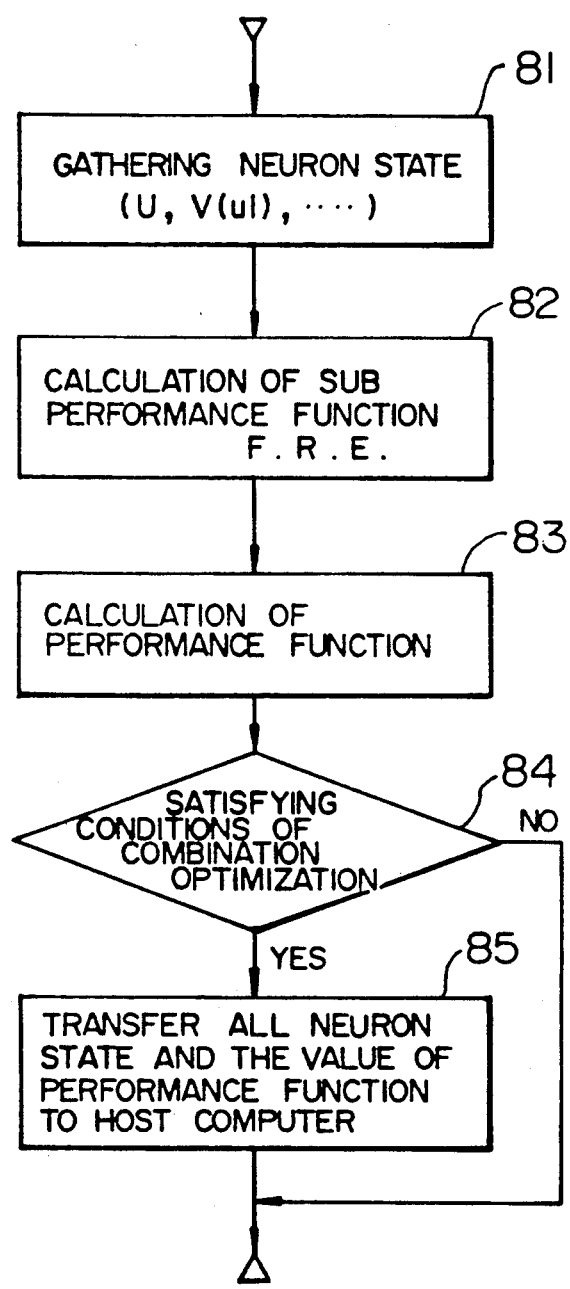
FIG. 12 is a flow chart of processings in the processor serving as supervisor.
Figure 14:
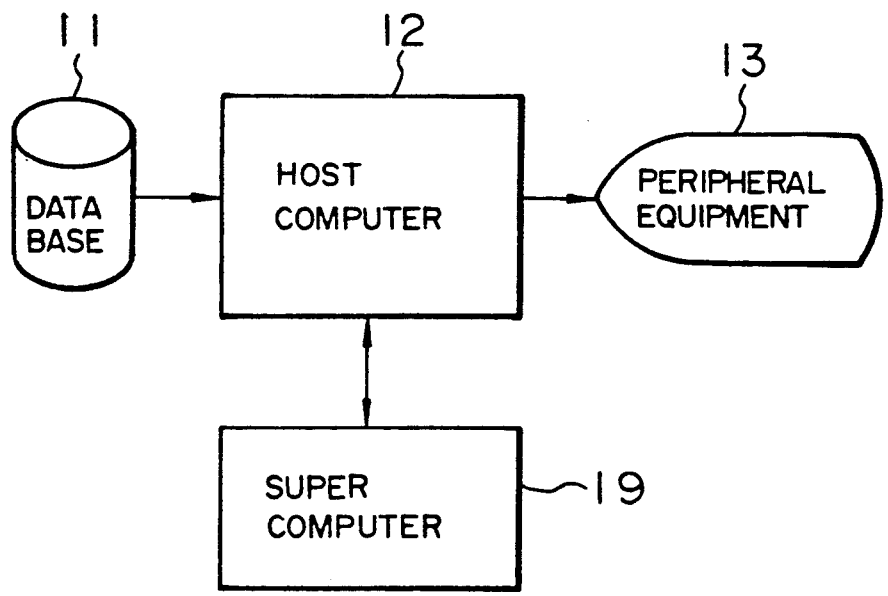
FIG. 14 is a schematic diagram illustrating a system arrangement using a super computer.
Figure 15:
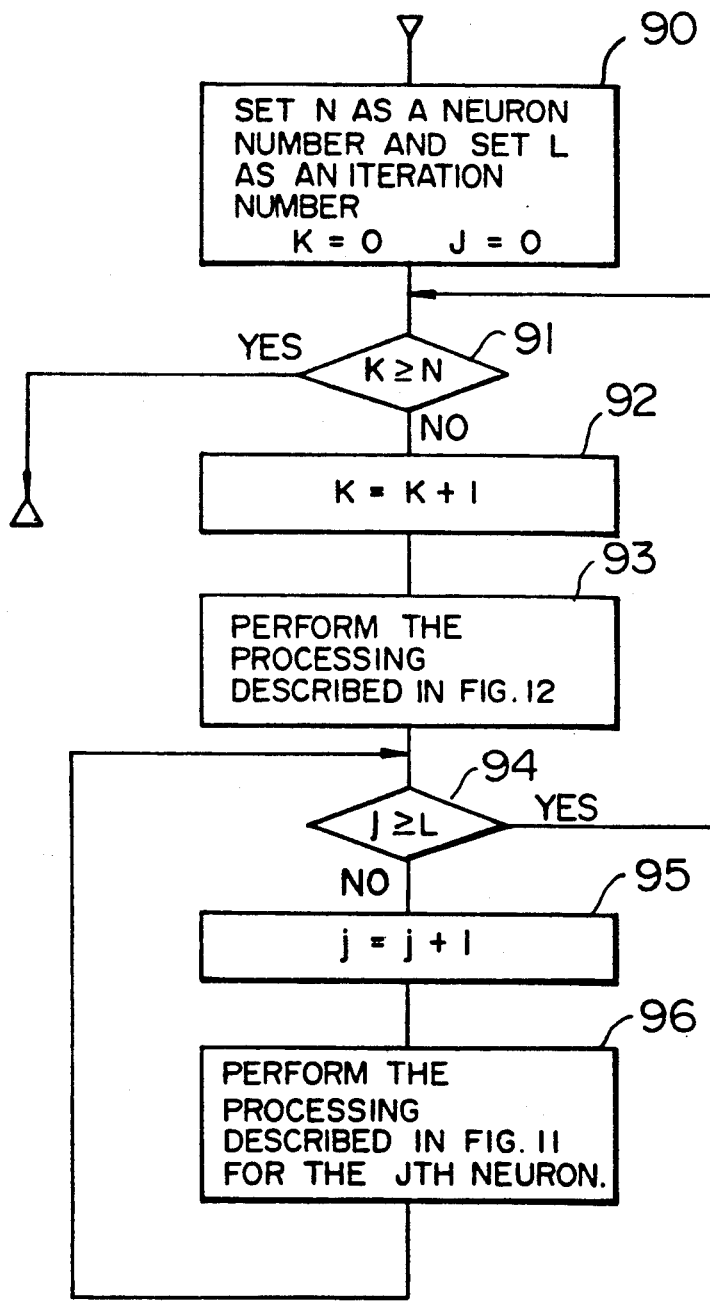
FIG. 15 is a flow chart showing processings in the system arrangement of FIG. 14.

In the foregoing description, a single processor is operatively allocated to each neuron to permit the parallel processing but neurocomputing may actually be realized using a large-scale computer or a super computer, as exemplified in FIG. 14. In this construction, a super computer 19 substitutes for the neurocomputer 18 of FIG. 4 and instead of the parallel processing shown in FIG. 13, a sequential processing flow as shown in FIG. 15 is executed. More particularly, individual neuron states are sequentially changed and at the time that the change of all of the neuron states ends, the performance function calculation procedure shown in FIG. 12 is executed.

The flow chart of FIG. 15 will now be detailed. In step 90, the number of neurons is set to N (variable). Parameters K and j for this procedure are initialized to zero. Also, the iteration number is set to L. In step 91, it is decided whether K exceeds N. If the answer is YES, the procedure ends. In step 92, the value of K is incremented. In step 93, calculation of sub-performance function (the preference) and performance function shown in FIG. 12 is executed, though not detailed herein. In step 94, it is decided whether j exceeds the iteration number L. If the answer is YES, the procedure returns to step 91. In step 95, the value of j is renewed In step 96, the procedure shown in FIG. 11 is executed for a j-th neuron.

Although processing of the neuron and processing of the processor 16 have been described as being carried out alternately, evaluation by the processor 16 is of no significance before the neuron state fluctuation taking place following initialization goes down and the somewhat stable neuron state recovers. Therefore, it is efficient that for a predetermined cycles of procedure following start, the evaluation calculation by the processor 16 is not carried out but only the nueron state fluctuation processing is effected with a view of reducing the processing time and thereafter the neuron state fluctuation processing and the evaluation calculation by the processor 16 serving as supervisor are carried out in accordance with synchronization sequence.

Figure 16:
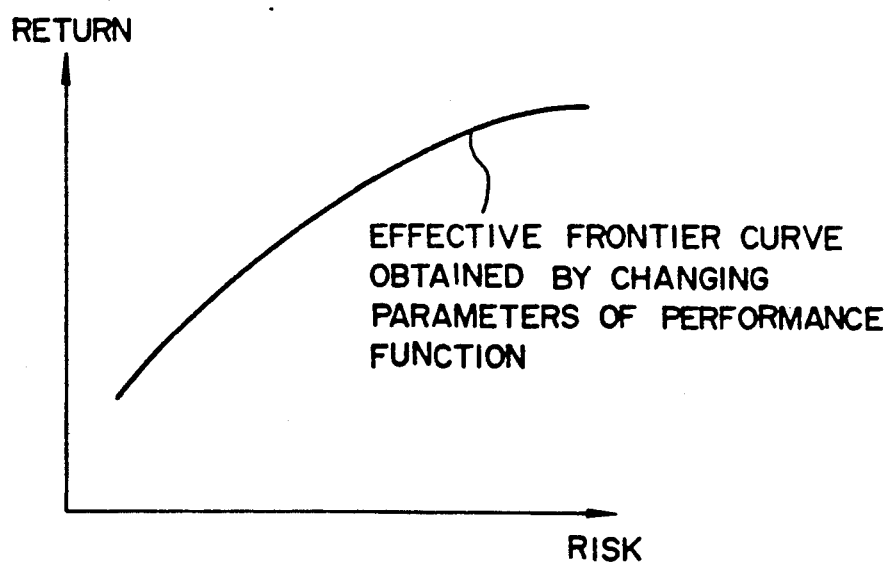
FIG. 16 is a graph showing an example of an effective frontier curve.

Through the above procedure, the portfolio capable of minimizing the performance function G of equation (8) can be determined for designated preference parameters. But, by changing the preference A for risk and the preference B for return, an effective frontier curve of risk and return for an optimum portfolio can be obtained on the two-dimensional plane of risk and return. For preparation of the effective frontier curve, values of risk and return for an optimum portfolio which are obtained for various values of the (A, B) set may be plotted on the screen. An example of plotting is illustrated in FIG. 16.

Figure 17:
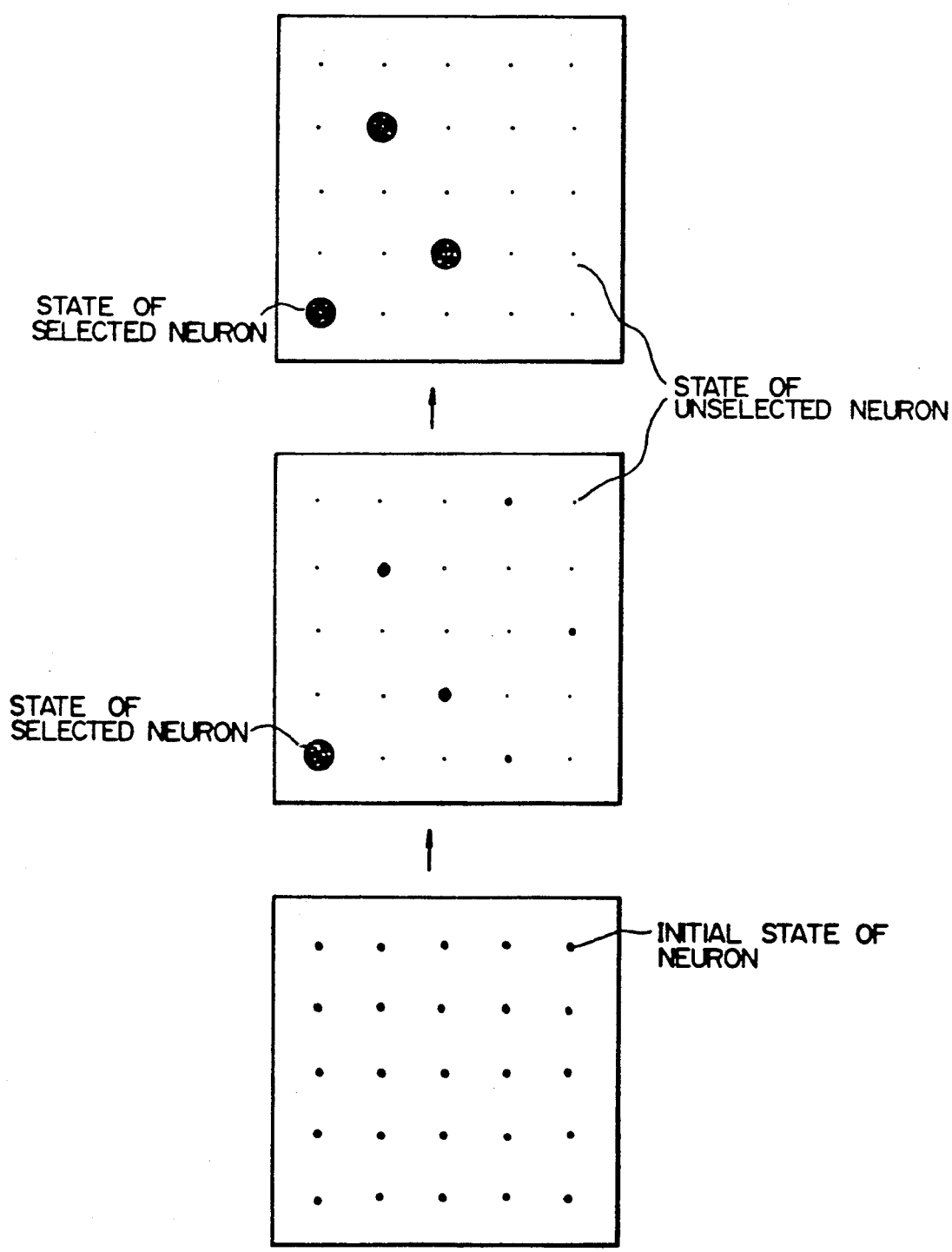
FIG. 17 shows plotting of neuron state fluctuation.

Further, in the present embodiment, individual neuron states are allotted to nodes of a network as shown in FIG. 17 to permit supervision of the calculation condition.

In FIG. 17, the size of nodes indicative of initial neuron states is increased to that of nodes indicative of sequentially selected neuron states or decreased to that of nodes indicative of sequentially unselected neuron states, clarifying process of sequential screening of candidates. This allows the condition of the neurocomputer to be monitored. [Method for Combination Optimization under Constraints]

The fundamental principle of the invention can be applied to the problem of 0-1 selection under constraints so that this problem can be solved in a manner to be described below by extending the ordinary nonlinear optimization means based on Lagrange multiplier.

A problem of optimum combination under equality constraints will be considered herein. More specifically, optimization of the equation (1) indicated by $$F(x_1, x_2, \ldots, x_N) \rightarrow \min \tag{1}$$

where $$x_i \in (0, 1)$$

is solved in respect of $x_1, x_2, \ldots, x_N$ satisfying constraint expressions (27) reading:

$$g_j(x_1, x_2, \ldots, x_N) = 0 \tag{27}$$

where $j = 1, \ldots, m.$

When $x_i$ takes continuous values, Language multipliers $\lambda_j (j=1, \ldots, m)$ are introduced and the problem comes to solving the following equation (28):

$$L(x_1, x_2, \ldots, x_N, \lambda_1, \lambda_2, \ldots, \lambda_m) = F(x_1, x_2, \ldots, x_N) + \quad (28)$$

$$\sum_{j=1}^{m} \lambda_j g_j(x_1, \ldots, x_N) \rightarrow \min.$$

To solve this optimization, a modified penalty function method is known and available. In this method, a modified penalty function reading $$Q(x, \psi, r) = F(x) + \sum_{i=1}^{m} \left\{ \psi_i g_i(x) + \frac{1}{r} [g_i(x)]^2 \right\} \quad (29)$$

where
$x = (x_1, \ldots, x_N)$
$\psi = (\psi_1, \ldots, \psi_m)$ is introduced and minimization of Q is considered. The variable x is determined so that the differential coefficient of Q in respect of x is zero. This condition is expressed by $$\frac{\partial Q(x, \psi, r)}{\partial x} = \frac{\partial F(x)}{\partial x} + \sum_{i=1}^{m} (\psi_i + 2 - g_i(x)) \frac{2 g_i(x)}{\partial x} = 0 \quad (30)$$

It will be appreciated from comparison of equation (30) with equation (28) that values of $$\psi_i + \frac{2}{r} g_i(x)$$

correspond to Language multipliers $\lambda_i$. Thus, as Language multiplier $\psi_i^{(k)}$ is renewed under renewal rule defined by $$\psi_i^{(k+1)} = \psi_i^{(k)} + \frac{2}{r} g_i(x), \quad (31)$$

the equation (1) can be minimized under constraints of equation (27) by minimizing equation (29). However, it is necessary that the renewal pursuant to equation (31) be carried out using x meeting $$\frac{\partial Q}{\partial x} = 0.$$

Figure 18:
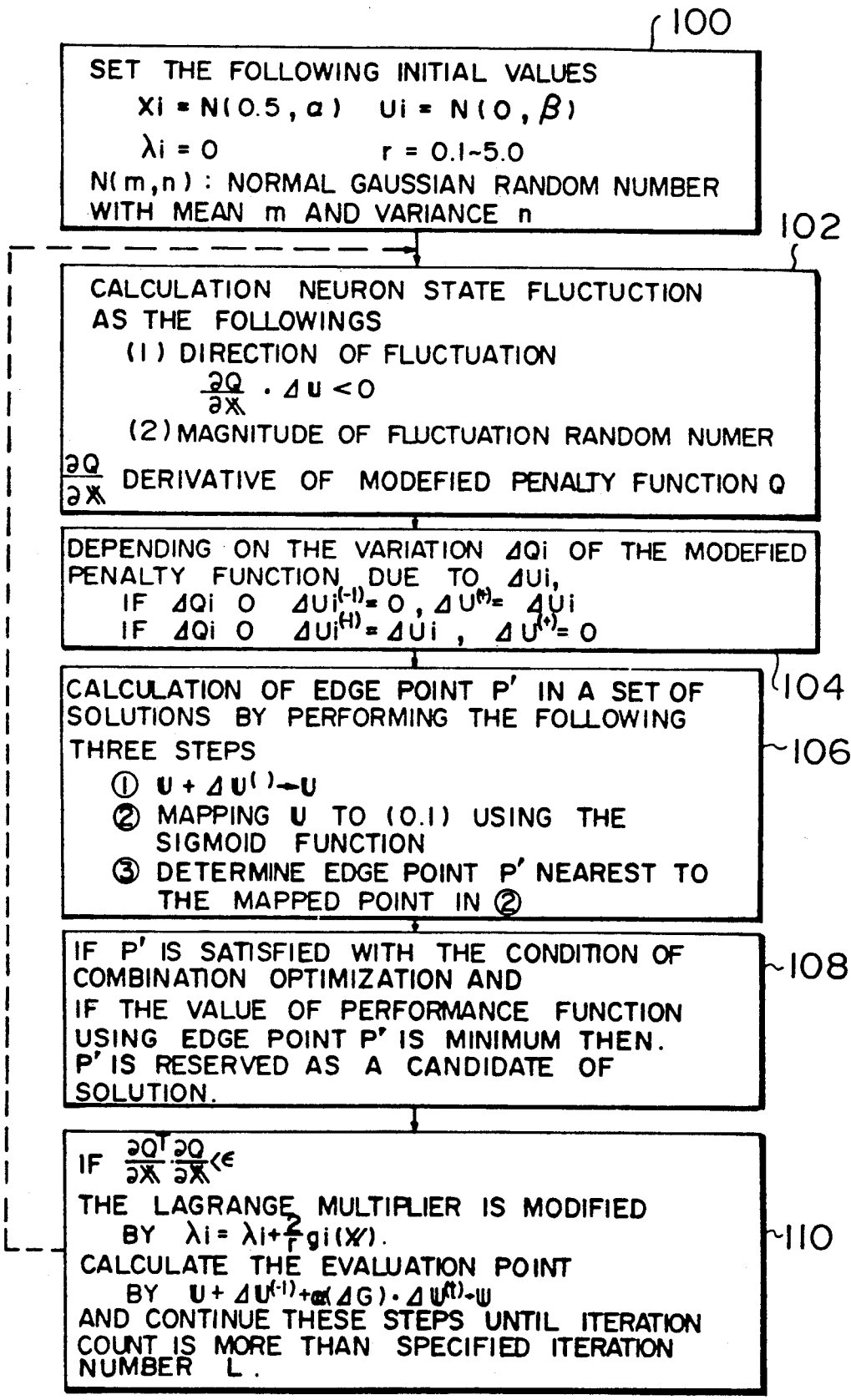
FIG. 18 is a flow chart showing processings in combination optimization under the condition of constraints.

When the above modified penalty method is applied to the 0–1 selection problem in which $x_i$ takes 0 or 1, the performance function appearing in the combination optimization procedure in neurocomputing according to the present embodiment is taken for the modified penalty function Q, the change $\Delta G_i$ of performance function G due to the fluctuation of $x_i$ is taken for $\Delta Q_i$, and renewal of the Language multiplier $\psi_i^{(k)}$ concomitant with the fluctuation of state u pursuant to equation (26) is effected in accordance with equation (31). In this manner, the problem of combination optimization under constraints can be solved. A flow of this procedure is shown in FIG. 18.

In step 100, initial values of $x_i$, $u_i$, $\lambda_i$ and r are set. In FIG. 18, the value of r is set to 0.1 to 5.0 to indicate only a preferable range and r may take any appropriate value. In step 102, the neuron state fluctuation is calculated. In step 104, $\Delta u_i$ is determined depending on $\Delta Q_i$ change in the modified penalty function. In step 106, an edge point P' of a set of solutions is calculated. If the edge point P' is satisfactory and the value of performance function using the edge point P' is minimum, the edge point P' is reserved as a candidate for solution in step 108. In step 110, the Language multiplier is modified and the next evaluation point is determined. The above steps are repeated until a scheduled iteration number is reached. The iteration is indicated by dotted line in FIG. 18.

In the stock portfolio selection problem, it is frequent that the condition for the market follow-up portfolio (the value of a follow-up ratio $\beta$ in market index) is designated as $$\sum_{i=1}^{N} \beta_i x_i = \beta_0, \quad (32)$$

investment I is estimated pursuant to $$\sum_{i=1}^{N} a_i x_i = I \quad (33)$$

and a portfolio is selected in such a manner that the risk of the portfolio can be minimized under constraints. In equation (32), $\beta_i$ is the market follow-up ratio of a stock i and in equation (33), $a_i$ is the current price of the stock i. Therefore, the aforementioned combination optimization method capable of taking constraints into consideration is practically effective.

As described above, according to the invention, the concept of neural net computing is applied and the neurocomputing is used to ensure that a substantially optimum combination of time series data pieces can be extracted using the parallel processing.

The effects of the present invention will be explained using numerical experimental results of the portfolio selection based on stock price data.

A table in FIG. 19 shows values of the risk equation (7) and return equation (6) for different values of sets of preference parameters A, B and C in the performance function F, the risk and return values being obtained when about 60 issues are selected from about 300 issues. In this table, the simulated annealing method is abbreviated as S.A. Numerical data in this table demonstrates that with the method of the present invention, portfolios capable of considerably decreasing the risk and increasing the return can be selected in any case. This evidences that the invention is very effective to this type of combination optimization.

We claim:
1. A system of processing time series data comprising:
   storage means for storing time series data pieces;
   a first processor means connected to said storage means for extracting characteristics of the time series data pieces and establishing a performance function for selecting at least one time series data piece from said time series data pieces stored in said storage means;
   a plurality of neurons connected to said first processor means, said neurons changing their states in accordance with said characteristics such that the neuron states satisfy said performance function; and, a second processor means connected to said plurality of neurons for evaluating individual neuron states, said second processor means selecting time series data pieces corresponding to the neuron states satisfying said performance function from said stored time series data pieces when results of evaluation indicate that said performance function is globally satisfied with the individual neuron states.

2. The time series data processing system according to claim 1 further comprising input means connected to said first processor means for inputting a preference used for selection of time series data pieces, said first processor means having means for establishing said performance function on the basis of the inputted preference.

3. The time series data processing system according to claim 1 wherein said second processor means further comprises means for mapping the individual neuron states to a space $\{0, 1\}$ and evaluating the neuron states on the basis of results of said mapping.

* * * * *